US011966477B2

(12) United States Patent
Fitzgerald et al.

(10) Patent No.: US 11,966,477 B2
(45) Date of Patent: Apr. 23, 2024

(54) METHODS AND APPARATUS FOR GENERIC PROCESS CHAIN ENTITY MAPPING

(71) Applicant: Musarubra US LLC, San Jose, CA (US)

(72) Inventors: Niall Fitzgerald, Cork (IE); Jonathan King, Hillsboro, OR (US); Christiaan Beek, Veenendaal (NL)

(73) Assignee: MUSARUBRA US LLC, San Jose, CA (US)

( * ) Notice: Subject to any disclaimer, the term of this patent is extended or adjusted under 35 U.S.C. 154(b) by 188 days.

(21) Appl. No.: 17/573,506

(22) Filed: Jan. 11, 2022

(65) Prior Publication Data

US 2023/0222220 A1 Jul. 13, 2023

(51) Int. Cl.
*G06F 21/57* (2013.01)
*G06F 21/51* (2013.01)
*G06F 21/56* (2013.01)

(52) U.S. Cl.
CPC ............ *G06F 21/577* (2013.01); *G06F 21/51* (2013.01); *G06F 21/56* (2013.01); *G06F 2221/033* (2013.01); *G06F 2221/2119* (2013.01)

(58) Field of Classification Search
CPC ........ G06F 21/577; G06F 21/51; G06F 21/56; G06F 2221/033; G06F 2221/2119; G06F 21/566
See application file for complete search history.

(56) References Cited

U.S. PATENT DOCUMENTS

| 5,613,097 | A  | * | 3/1997 | Bates | G11B 27/28 |
| 6,519,626 | B1 | * | 2/2003 | Soderberg | G06F 16/10 |
|  |  |  |  |  | 709/217 |
| 7,389,344 | B2 | * | 6/2008 | Burrell | G06F 11/3495 |
|  |  |  |  |  | 709/224 |
| 7,398,471 | B1 | * | 7/2008 | Rambacher | H04L 67/306 |
|  |  |  |  |  | 709/224 |
| 7,814,554 | B1 | * | 10/2010 | Ragner | G06F 21/52 |
|  |  |  |  |  | 713/193 |
| 7,908,252 | B1 | * | 3/2011 | Landt | G06F 16/24 |
|  |  |  |  |  | 707/687 |
| 8,185,684 | B1 | * | 5/2012 | Naftel | G06F 9/45558 |
|  |  |  |  |  | 711/6 |
| 9,003,533 | B1 | * | 4/2015 | Gummerman | G06F 21/566 |
|  |  |  |  |  | 707/685 |
| 9,215,245 | B1 | * | 12/2015 | Rajab | G06F 21/50 |

(Continued)

*Primary Examiner* — Aravind K Moorthy
(74) *Attorney, Agent, or Firm* — Hanley, Flight & Zimmerman, LLC

(57) ABSTRACT

Methods, apparatus, systems and articles of manufacture are disclosed for generic process chain entity mapping. An example apparatus includes at least one memory, instructions in the apparatus, and processor circuitry to execute the instructions to receive process chain input data, the input data including a system path, identify a match between a path alias and the input data, wherein the path alias includes an alias for one or more system path format patterns, extract at least one of (1) metadata information or (2) command line parameter information from the match, and output transformed data based on the at least one of the extracted metadata information or command line parameter information, the transformed data output in a generalized format.

20 Claims, 9 Drawing Sheets

(56) References Cited

U.S. PATENT DOCUMENTS

| | | | |
|---|---|---|---|
| 9,294,498 B1* | 3/2016 | Yampolskiy | G06F 21/56 |
| 9,529,630 B1* | 12/2016 | Fakhouri | G06F 9/5011 |
| 9,680,874 B1* | 6/2017 | Burnett | G06F 21/566 |
| 9,734,337 B1* | 8/2017 | Patton | G06F 21/568 |
| 10,122,742 B1* | 11/2018 | Oprea | H04L 63/1425 |
| 10,521,587 B1* | 12/2019 | Agranonik | G06F 21/563 |
| 10,747,872 B1* | 8/2020 | Ha | G06F 21/54 |
| 10,795,991 B1* | 10/2020 | Ross | G06F 21/554 |
| 11,314,859 B1* | 4/2022 | Singh | G06F 21/554 |
| 11,343,470 B1* | 5/2022 | Cronan | G06F 3/04842 |
| 11,509,674 B1* | 11/2022 | Beauchesne | H04L 63/1425 |
| 11,831,729 B2* | 11/2023 | Herzog | H04L 67/34 |
| 2002/0144129 A1* | 10/2002 | Malivanchuk | G06F 21/564 |
| | | | 713/188 |
| 2005/0273858 A1* | 12/2005 | Zadok | H04L 67/06 |
| | | | 709/230 |
| 2007/0067256 A1* | 3/2007 | Zayas | G06F 16/10 |
| 2008/0256340 A1* | 10/2008 | Conger | G06F 21/577 |
| | | | 712/217 |
| 2009/0164738 A1* | 6/2009 | Erfani | G06F 12/0888 |
| | | | 711/E12.063 |
| 2009/0228821 A1* | 9/2009 | Tapper | G06F 9/54 |
| | | | 718/1 |
| 2010/0115334 A1* | 5/2010 | Malleck | G06F 11/1438 |
| | | | 714/15 |
| 2010/0154038 A1* | 6/2010 | Natarajan | G06F 21/62 |
| | | | 726/5 |
| 2011/0225655 A1* | 9/2011 | Niemela | G06F 21/566 |
| | | | 726/22 |
| 2011/0246966 A1* | 10/2011 | Harron, III | G06F 8/44 |
| | | | 717/124 |
| 2012/0266244 A1* | 10/2012 | Green | H04L 63/145 |
| | | | 726/24 |
| 2014/0122542 A1* | 5/2014 | Barnes | G06F 16/168 |
| | | | 707/822 |
| 2015/0261971 A1* | 9/2015 | McFerrin | H04L 63/10 |
| | | | 707/781 |
| 2016/0292441 A1* | 10/2016 | Stuntebeck | G06F 21/6218 |
| 2016/0337369 A1* | 11/2016 | Sanso | H04L 63/0807 |
| 2016/0381023 A1* | 12/2016 | Dulce | H04L 63/1408 |
| | | | 726/9 |
| 2017/0115981 A1* | 4/2017 | Oh | G06F 21/64 |
| 2017/0244672 A1* | 8/2017 | Shulman | H04L 61/5007 |
| 2017/0364347 A1* | 12/2017 | Adler | G06F 16/119 |
| 2017/0373853 A1* | 12/2017 | Soman | H04L 9/3239 |
| 2018/0181584 A1* | 6/2018 | Bestler | G06F 16/134 |
| 2018/0293381 A1* | 10/2018 | Tseng | G06N 20/00 |
| 2018/0357051 A1* | 12/2018 | Puszkiewicz | G06F 9/45512 |
| 2019/0065741 A1* | 2/2019 | Zhang | G06F 21/56 |
| 2019/0228148 A1* | 7/2019 | Pohl | G06F 3/0659 |
| 2019/0236282 A1* | 8/2019 | Hulick, Jr. | G06F 16/951 |
| 2019/0251251 A1* | 8/2019 | Carson | G06F 21/561 |
| 2019/0379699 A1* | 12/2019 | Katragadda | H04L 63/1425 |
| 2020/0076770 A1* | 3/2020 | Biran | G06F 21/52 |
| 2020/0097653 A1* | 3/2020 | Mehta | G06N 3/045 |
| 2021/0089500 A1* | 3/2021 | Ball | H04L 67/06 |
| 2021/0133557 A1* | 5/2021 | Iyoob | G06F 40/205 |
| 2021/0157914 A1* | 5/2021 | Gauthier | G06N 20/20 |
| 2021/0194904 A1* | 6/2021 | Zhang | H04L 63/20 |
| 2021/0286895 A1* | 9/2021 | Yang | G06F 21/563 |
| 2021/0397697 A1* | 12/2021 | Kulaga | G06F 21/6245 |
| 2022/0075646 A1* | 3/2022 | Landau | G06F 9/5016 |
| 2022/0138336 A1* | 5/2022 | Luciani, Jr. | G06F 21/6218 |
| | | | 726/1 |
| 2022/0182395 A1* | 6/2022 | Cai | G06N 3/044 |
| 2022/0198024 A1* | 6/2022 | Hendrickx | G06F 8/70 |
| 2022/0207142 A1* | 6/2022 | Gupta | G06F 21/52 |
| 2023/0019015 A1* | 1/2023 | Ahmed | G06F 9/54 |

\* cited by examiner

METHODS AND APPARATUS FOR GENERIC PROCESS CHAIN ENTITY MAPPING

FIELD OF THE DISCLOSURE

This disclosure relates generally to malware, and, more particularly, to methods and apparatus for generic process chain entity mapping.

BACKGROUND

Malware (e.g., viruses, worms, trojans, ransomware) is malicious software disseminated by attackers to launch a wide range of security attacks, such as stealing users' private information, hijacking devices remotely to deliver massive spam emails, infiltrating a users' online account credentials, etc. The introduction of malware to a computing system may cause serious damages to computer equipment and/or data and/or may cause significant financial loss to Internet users and/or corporations.

Figure 1:
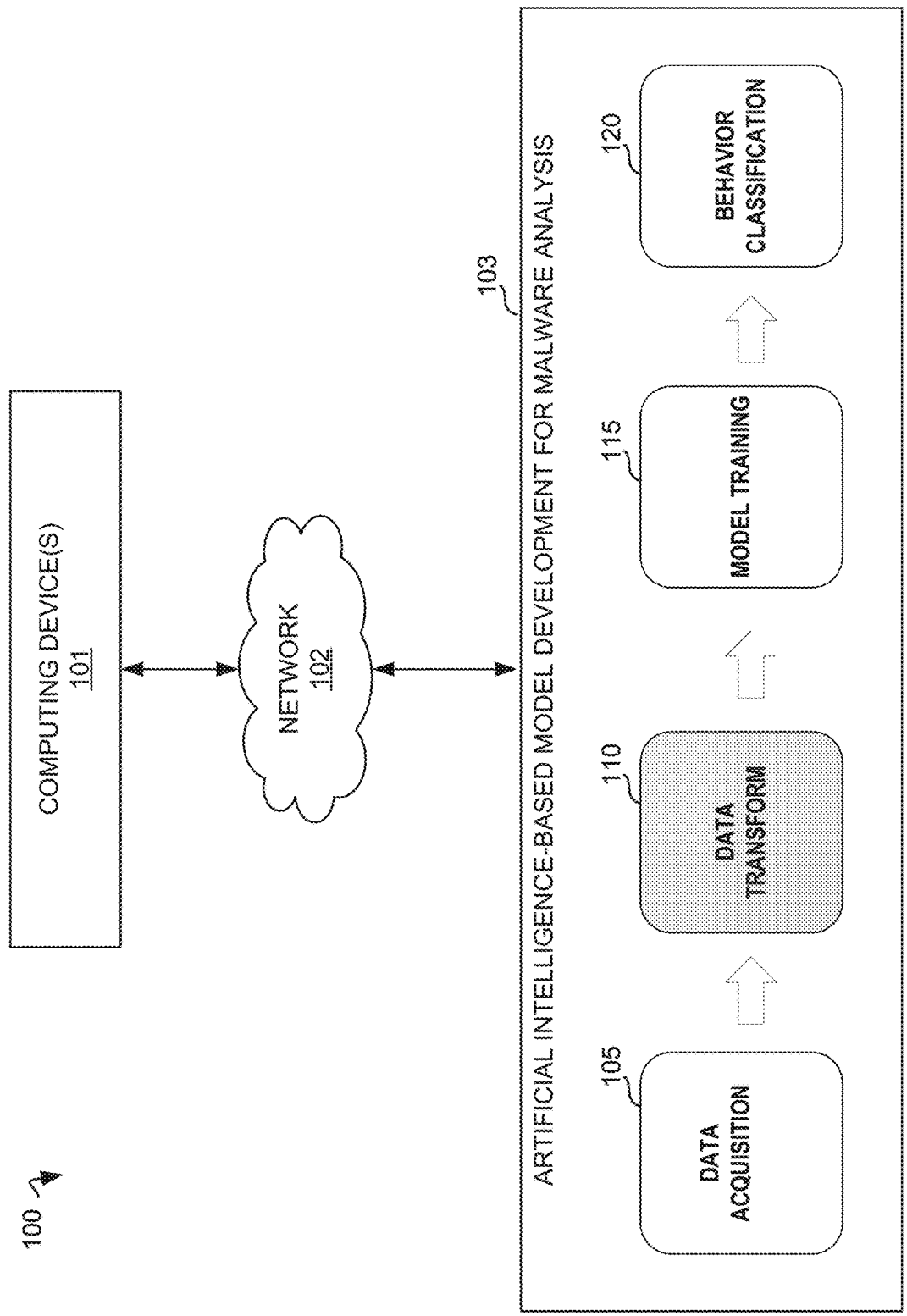
FIG. 1 illustrates an example environment in which model training is performed using a data transform stage in accordance with teachings disclosed herein.

The figures are not to scale. In general, the same reference numbers will be used throughout the drawing(s) and accompanying written description to refer to the same or like parts. Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time+/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Computing system security depends on the identification and elimination of malicious software. Malware has a wide range of forms and variations (e.g., viruses, worms, rootkits, botnets, Trojan horses, etc.) that exploit software vulnerabilities in browsers and operating systems in order to spread, resulting in the launching of distributed denial of service attacks (DDoS), collection of classified information, and other activities that compromise privacy and security. Fileless malware, for example, uses legitimate programs to infect a computer, avoiding reliance on files and leaving no footprint, thereby making the malware challenging to detect and remove. In some examples, fileless malware is developed by scrutinizing the strategies organizations can use to try to block such malware-based attacks, allowing fileless malware to evade existing security solutions. For example, fileless malware can go undetected by antivirus, whitelisting, and/or other endpoint security solutions. Signature and hash-based anti-virus scanners can provide a first line of defense, but such scanners are less effective against attacks that primarily leverage dual-use or operating system-provided binaries to accomplish the malicious objective. For example, a dual use tool can be difficult to block, given that such a tool may be critical for the functioning of the operating system or the administration of the system via an information technology (IT) department. As such, customers and/or enterprises can require protection with an additional layer of defense by focusing on monitoring process chain behavior as it executes over time.

In some examples, a file-less attack process chain involves one or more hosts and/or combinations of behaviors across the spectrum of initial access, persistence, privilege-escalation, discovery, lateral-movement and/or exfiltration. With adequate systems in place, traces of process chains are collected in the form of indicators of compromise which can take the form of file, process create, modify, and/or delete events between parent and child processes as well as remote URLs/IP queries, registry key modifications and/or obfuscated code strings. A major challenge is the volume of data with malicious processes sitting amidst web-scale levels of both malicious and benign threat telemetry. The data volumes prohibit manual inspection, while artificial intelligence models (trained on vast amounts of historically labelled data) can advantageously be deployed to highlight potentially malicious behaviors automatically.

Artificial intelligence-based models can include steps such as data acquisition, data transform, model training, and/or behavior classification. One of the challenges faced when training a model is the almost infinite number of combinations of entities forming the behavioral trace. For example, a behavioral trace can consist of multiple entity types spanning file/processes information, trust information, file extension, persistence paths, URLs/IP addresses, command line parameters and/or parent/child process information. Due to the high cardinality of entity types, the model training stage can be faced with challenges of overfitting, poor out-of-sample classifications, model drift, as well as time and compute intensive processing due to a large number of parameters within the training set. As such, improvements in the usage of artificial intelligence models for the detection and/or identification of fileless malware is desirable.

Methods and apparatus disclosed herein introduce an entity mapping transformation framework within the data transform stage of an artificial intelligence model to improve the detection of fileless malware. For example, methods and apparatus disclosed herein permit the reduction of the number of parameters required to represent the same data without loss of information. Furthermore, methods and apparatus disclosed herein introduce artificial intelligence-based model training time and/or cost reduction and the potential for better tuned models and out-of-sample classification metrics. The transformed entities also guard against overfitting and can make available generalizable building blocks amenable to both model and rules-based approaches. In examples disclosed herein, a framework is introduced for conversion of process tree elements from highly specific entities to universally labelled generic entities without loss of key entity characteristic information. As such, process chain representation (e.g., representation of the process chain across all entities including command line parameters) can be converted to a generalized format. In examples disclosed herein, commonly used paths can be identified for both clean and/or malicious process chain actors. Furthermore, methods and apparatus disclosed herein permit the inclusion of mappings allowing discrimination of clean and/or malicious process chain actors in traces. In examples disclosed herein, key original entity characteristics are preserved in a transformed format. Therefore, the application of transformations disclosed herein decrease the need for performing multiple additional measures during artificial intelligence-based model training to prevent overfitting and/or model drift.

FIG. 1 illustrates an example environment 100 in which model training is performed using a data transform stage in accordance with teachings disclosed herein. In the example of FIG. 1, computing device(s) 101 receive information from a network 102, which can in turn receive output from an artificial intelligence-based model for malware analysis and/or malware threat-based identification 103. In the example of FIG. 1, computing device(s) 101 can implement a workstation, a personal computer, a tablet computer, a smartphone, a laptop, and/or any other type of computing device that uses computer and/or mobile software (e.g., applications). The computing device(s) 101 may host applications used in receiving and sending electronic communications. For example, the computing device(s) 101 may host applications such as a messaging application, a phone call application, social media applications (e.g., Twitter, Facebook, Instagram, etc.), an email application, a browser application, and/or instant messaging applications (e.g., Skype). However, other applications may additionally and/or alternatively be included on the computing device(s) 101. The computing device(s) 101 can communicate with other devices on the network 102 via a wireless and/or wired connection. The computing device(s) 101 of FIG. 1 include a communication interface that allows for the submission of potential malware samples (e.g., samples to be assessed to determine the presence of malicious software) to the artificial intelligence-based model for malware analysis 103 via the network 102. For example, the malware samples can originate from malware such as computer viruses, computer worms, trojan viruses, rootkits, adware, spyware, bots, fileless malware, ransomware, ghost mining, and/or any other type of malicious software, code, programs, etc. In some examples, the potential malware samples are provided to the artificial intelligence-based model for malware analysis 103 via an installed anti-virus program that detects and isolates malware samples that are sent to the artificial intelligence-based model for malware analysis 103 for further assessment and classification (e.g., part of a known malware family, part of a new malware family, clean sample, etc.). However, any other method of transmitting a potential malware sample from the computing device(s) 101 to the artificial intelligence-based model for malware analysis 103 via the network 102 can be used.

In some examples, the communication interface used to transmit a potential malware sample from the computing device(s) 101 to the artificial intelligence-based model for malware analysis 103 is wired (e.g., an Ethernet connection). In other examples, the communication interface is wireless (e.g., a WLAN, a cellular network, etc.). However, any other method and/or system of communication may additionally or alternatively be used such as, for example, a Bluetooth connection, a Wi-Fi connection, etc. In some examples, the wireless communication between the computing device(s) 101 and the artificial intelligence-based model for malware analysis 103 can be implemented using a cellular connection via a Global System for Mobile Communications (GSM) connection. However, any other systems and/or protocols for communications may be used such as, for example, Time Division Multiple Access (TDMA), Code Division Multiple Access (CDMA), Worldwide Interoperability for Microwave Access (WiMAX), Long Term Evolution (LTE), etc.

In the example of FIG. 1, the network 102 may be implemented using any type of public or private network including the Internet, a telephone network, a local area network (LAN), a cable network, and/or a wireless network. As used herein, the phrase "in communication," including variances thereof, encompasses direct communication and/or indirect communication through one or more intermediary components and does not require direct physical (e.g., wired) communication and/or constant communication, but rather additionally includes selective communication at periodic or aperiodic intervals, as well as one-time events.

The artificial intelligence-based model for malware analysis 103 can be developed using a data acquisition stage 105, a data transform stage 110, a model training stage 115, and/or a behavior classification stage 120. For example, the data acquisition stage 105 can include the acquisition of data from various sources that can be used for model-based training. The data acquisition stage 105 can include data discovery (e.g., indexing, sharing, and/or searching for datasets), data augmentation (e.g., enriching the existing dataset by including additional external data), and/or data generation. The data transform stage 110 can include transforming the data to better position the data for model training (e.g., processing the data prior to the training phase by changing data type, account for missing data, convert data to specific formats, etc.), while the model training stage 115 consists of training the model using the transformed data acquired from the data transform stage 110. In some examples, the data transform stage 110 includes preprocessing of executable files to extract a set of features that provide an abstract view of a given piece of software that can be used for the detection and/or classification of malware during the model training stage 115. The model training stage 115 can include the use of the transformed data to train a machine learning algorithm. The model training stage 115 can further include processing input data through the algorithm to correlate the processed output against the sample output, thereby using the results of the model training to further modify and/or improve the model. Therefore, the accuracy of the initial training dataset and/or validation dataset can be critical for the final model precision.

In some examples, the machine learning model can be trained using supervised learning when the training data includes both input and output values, such that training is performed based on deviations of processed results from the documented results. In some examples, the machine learning model can be trained using unsupervised learning when data patterns are determined with additional data used to fit identified clusters and/or patterns, with model accuracy improvements achieves based on a correlation of the identified patterns and/or clusters to the expected patterns and/or clusters of data. Once the model training stage 115 is complete, the trained model can be used to perform behavior classification (e.g., identification of malware) using the behavior classification stage 120. Machine learning-based algorithms can be used to process large volumes of data while improving the evolution of malware detection systems to overcome the limitations of traditional antivirus engines and keep pace with new malware attacks and their variants.

Figure 2:
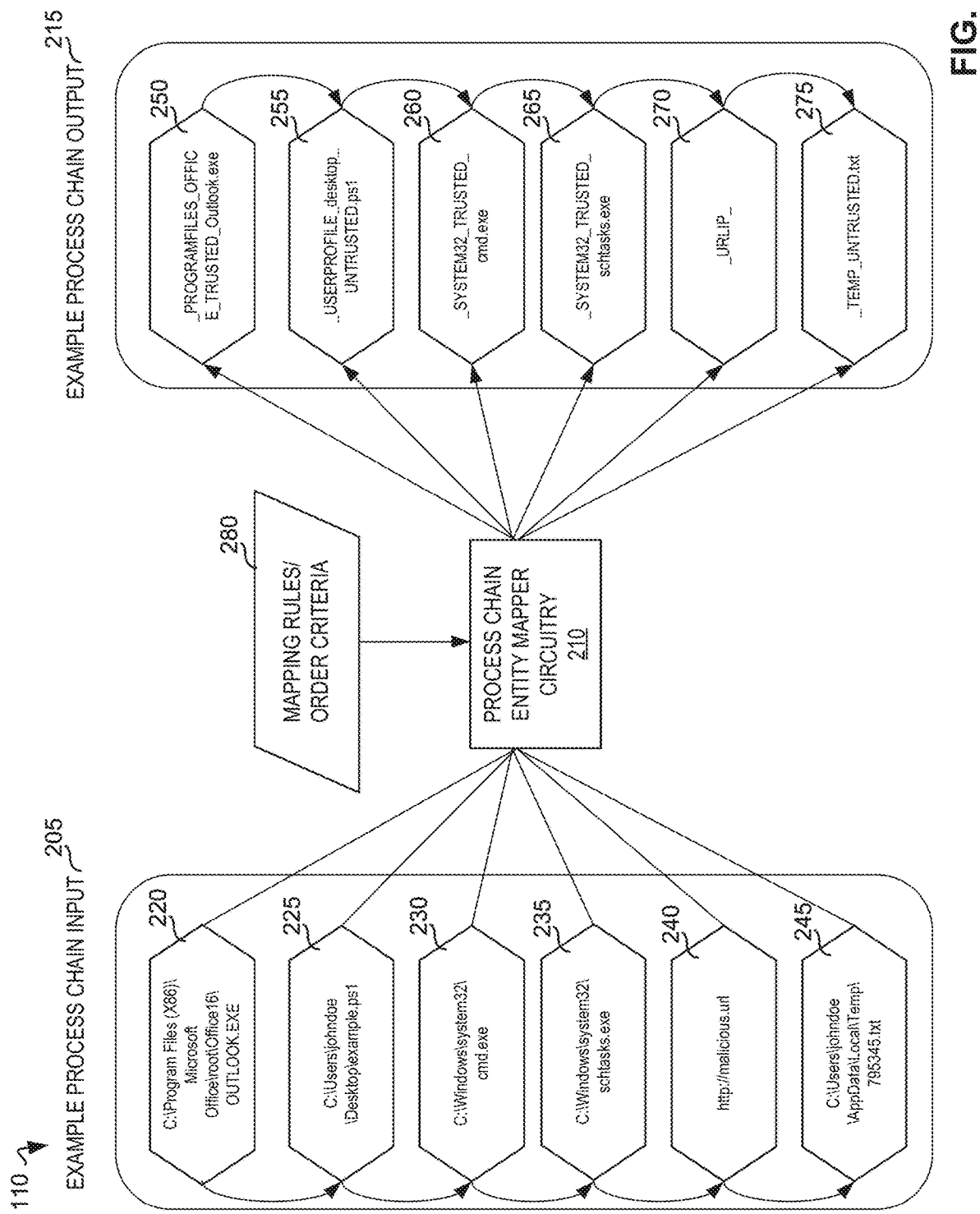
FIG. 2 illustrates an example process chain entity mapper circuitry used in the data transform state of FIG. 1.

FIG. 2 illustrates an example process chain entity mapper circuitry 210 used in the data transform stage 110 of FIG. 1. In the example of FIG. 2, a data transform stage 110 mapping illustrates process chain input 205 that is provided to the process chain entity mapper circuitry 210 for processing, thereby resulting in process chain output 215. In the example of FIG. 2, the process chain input 205 can include various type(s) of files 220, 225, 230, 235, 240, 245. The files 220, 225, 230, 235, 240, 245 can include file type(s) such as an executable file (.exe) (e.g., files 220, 230, 235), a script file (psi) (e.g., file 225), a Uniform Resource Locator (URL) file (.url) (e.g., file 240), and/or a text file (.txt) (e.g., file 245). In the example of FIG. 2, the process chain entity mapper circuitry 210 transforms the process chain input 205 to yield the process chain output 215 (e.g., file(s) 250, 255, 260, 265, 270, 275) using example mapping rules and/or order criteria 280. In some examples, the mapping rules and/or order criteria 280 include path alias mapping rules and/or order criteria based on empirical evidence. For example, the mapping rules and/or order criteria 280 can include an extendable data-frame with information on potential system path format patterns and/or associated alias for each of the potential system path format patterns. In some examples, the mapping rules and/or order criteria 280 can include information on which patterns to prioritize when performing matching using the process chain mapping entity circuitry 210, as described in connection with FIGS. 3, 4, and/or 5. In some examples, the mapping rules and/or order criteria 280 can be based on empirical evidence derived from field telemetry (e.g., telemetry data received via a cloud server, including security-related information connected to file creations, timestamps, and/or any other data necessary for assessing targeted attacks via malware).

In the example of FIG. 2, the process chain entity mapper circuitry 210 evaluates the process chain input 205 file(s) against each potential pattern identified in the mapping rules and/or order criteria 280 until a match is identified. In some examples, the process chain entity mapper circuitry 210 extracts metadata information (e.g., file reputation, process extension, etc.) for each file and/or entity. In some examples, the process chain entity mapper circuitry 210 also extracts command line parameter information (e.g., URL/Internet Protocol (IP), registry key path, etc.). The process chain entity mapper circuitry 210 can then transform the metadata information extracted from the entity to yield the process chain output 215 file(s). In the example of FIG. 2, the process chain entity mapper circuitry 210 receives input file(s) 220-245 and transforms them to output file(s) 250-275, respectively. For example, the process chain entity mapper circuitry 210 receives file 220 (e.g., a Microsoft Office-derived executable file), evaluates the file 220 input against each path alias available via the mapping rules and/or order criteria 280, extracts metadata information (e.g., including the .exe file extension), and outputs file 250 with a generalized format. This process can be repeated using each of the remaining input files 225-245. In some examples, the process chain input 205 file(s) can change while the process chain output 215 file(s) remain the same in terms of the type of generalized output that is generated for the given file input(s) (e.g., different versions of a Microsoft Outlook path can yield the same generalized file output). As such, this matching process allows for the identification of commonly used paths for both trusted and/or untrusted process chain files and the iterative mapping associated with discriminating future input files as clean or malicious. In some examples, trust information is obtained as meta information from a database source from either within an anti-virus software internal database or from an anti-virus software cloud application programming interface (API) response. In some examples, meta-information based on a file certificate can also be used to obtain information about trust for a given file. Furthermore, the output file(s) 250-275 retain key original entity characteristics in the transformed format. While in some examples the process chain inputs could instead be tokenized via string indices, using such an approach could affect the high cardinality of chain entities. Likewise, the use of unique string truncation can potentially result in loss of input signal. As such, methods and apparatus presented herein permit decreasing the parameter space, thereby retaining the original input signal.

Figure 3:
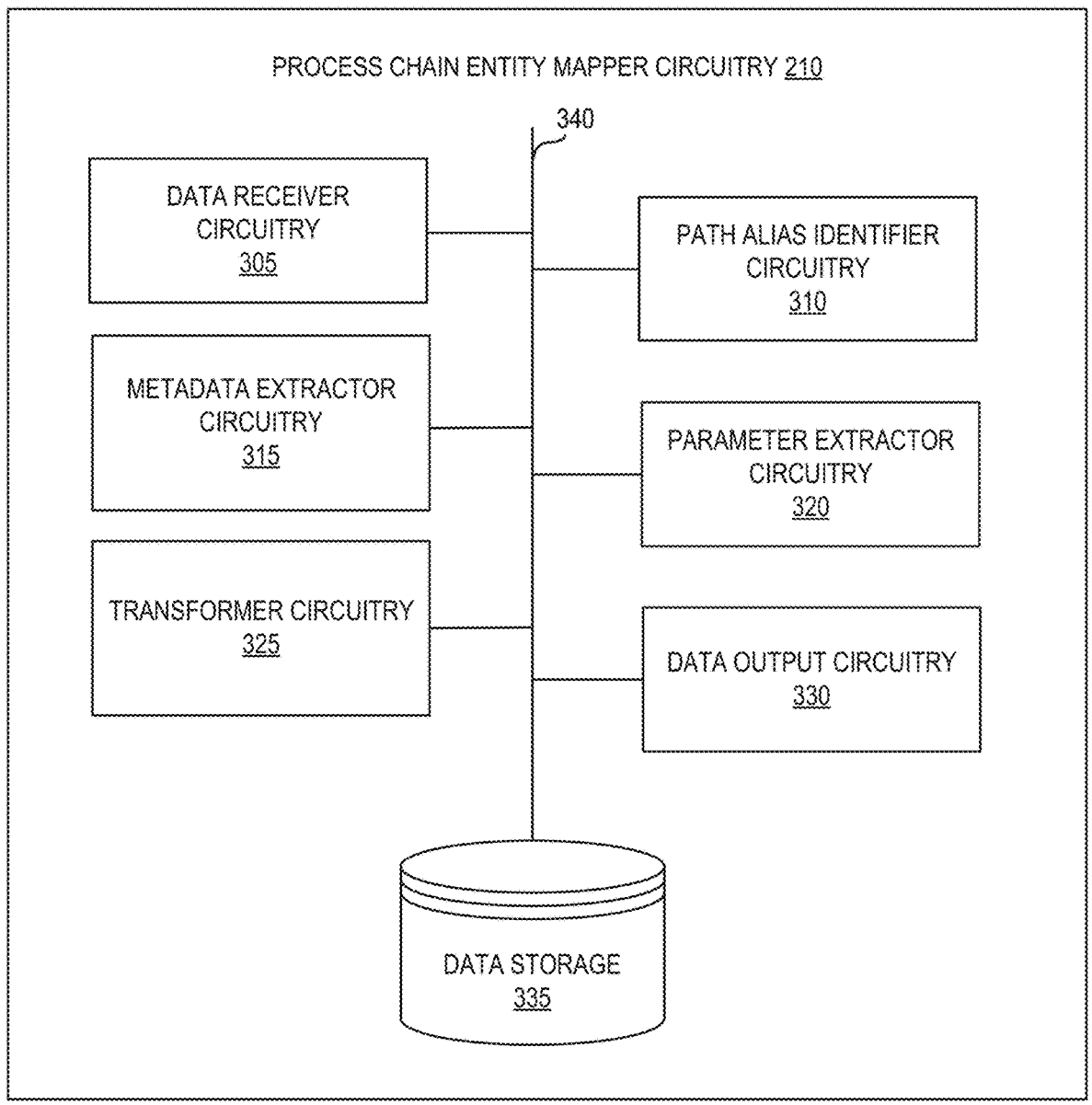
FIG. 3 is a block diagram representative of the process chain entity mapper circuitry that may be implemented in the example environment of FIGS. 1-2.

FIG. 3 is a block diagram 300 representative of the process chain entity mapper circuitry 210 that may be implemented in the example environment of FIGS. 1-2. In FIG. 3, the process chain entity mapper circuitry 210 includes an example data receiver circuitry 305, an example path alias identifier circuitry 310, an example metadata extractor circuitry 315, an example parameter extractor circuitry 320, an example transformer circuitry 325, an example data output circuitry 330, and/or an example data storage 335. In the example of FIG. 3, the data receiver circuitry 305, the path alias identifier circuitry 310, the metadata extractor circuitry 315, the parameter extractor circuitry 320, the transformer circuitry 325, the data output circuitry 330, and/or the data storage 335 are in communication using a bus 340.

The data receiver circuitry 305 receives input data corresponding to the process chain input 205 and/or the mapping rules/order criteria 280 input. The data receiver circuitry 305 receives any type of file associated with the process chain input 205 (e.g., .psi file, .exe file, .txt file, etc.). In some examples, the data receiver circuitry 305 can receive submission of potential malware samples (e.g., samples to be assessed to determine the presence of malicious software) to the process chain entity mapper circuitry 210. For example, the malware samples can originate from malware such as computer viruses, computer worms, trojan viruses, rootkits, adware, spyware, bots, file-less malware, ransomware, ghost mining, and/or any other type of malicious software, code, programs, etc. In some examples, the potential malware samples are provided to the process chain entity mapper circuitry 210 via an installed anti-virus program that detects and isolates malware samples that are sent to the process chain entity mapper circuitry 210 for further assessment and classification (e.g., part of a known malware family, part of a new malware family, clean sample, etc.). However, any other method of transmitting a potential malware sample from a source to the process chain entity mapper circuitry 210 can be used.

In some examples, the process chain entity mapper circuitry 210 includes means for receiving process chain input data. For example, the means for receiving process chain input data may be implemented by data receiver circuitry 305. In some examples, the data receiver circuitry 305 may be implemented by machine executable instructions such as that implemented by at least block 505 of FIG. 5 executed by processor circuitry, which may be implemented by the example processor circuitry 612 of FIG. 6, the example processor circuitry 700 of FIG. 7, and/or the example Field Programmable Gate Array (FPGA) circuitry 800 of FIG. 8. In other examples, the data receiver circuitry 305 is implemented by other hardware logic circuitry, hardware implemented state machines, and/or any other combination of hardware, software, and/or firmware. For example, the data receiver circuitry 305 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

The path alias identifier circuitry 310 identifies a path alias that can be used as part of the mapping rules and/or order criteria 280 of FIG. 2. For example, the path alias identifier circuitry 310 identifies path alias mapping rules and/or order criteria based on empirical evidence. In some examples, the path alias identifier circuitry 310 identifies the path alias based on empirical evidence derived from field telemetry. For example, the path alias identifier circuitry 310 can identify an extendable data-frame with information on potential system path format patterns and/or associated aliases for each of the potential system path format patterns received by the data receiver circuitry 305. In some examples, the path alias identifier circuitry 310 can identify which patterns to prioritize when performing matching using the process chain mapping entity circuitry 210.

In some examples, the process chain entity mapper circuitry 210 includes means for identifying a match between a path alias and the input data. For example, the means for identifying a match between a path alias and the input data may be implemented by path alias identifier circuitry 310. In some examples, the path alias identifier circuitry 310 may be implemented by machine executable instructions such as that implemented by at least block 510, 515, 520 of FIG. 5 executed by processor circuitry, which may be implemented by the example processor circuitry 612 of FIG. 6, the example processor circuitry 700 of FIG. 7, and/or the example Field Programmable Gate Array (FPGA) circuitry 800 of FIG. 8. In other examples, the path alias identifier circuitry 310 is implemented by other hardware logic circuitry, hardware implemented state machines, and/or any other combination of hardware, software, and/or firmware. For example, the path alias identifier circuitry 310 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

The metadata extractor circuitry 315 extracts metadata information (e.g., file reputation, process extension, etc.) for each file and/or entity received using the data receiver circuitry 305. In some examples, the metadata extractor circuitry 315 permits the extraction of information that can assist in the identification of malware. For example, the metadata extractor circuitry 315 can review files for any linked URL and/or portable document format (PDF). In some examples, the metadata extractor circuitry 315 identifies macros associated with word documents. In some examples, the metadata extractor circuitry 315 can identify any image-based data (e.g., a Joint Photographic Experts Group (JPEG) file) associated with a given entity in order to identify any potential malware that could be hidden in the binary of the JPEG file. For example, a JPEG file can include metadata associated with images and/or textual information that can include a name of the image (e.g., a photograph), location identifying where the image was taken, a timestamp associated with the image, and/or other information associated with the JPEG file. As such, the metadata extractor circuitry 315 can extract information indicating a given file name, size, type (e.g., JPEG), type extension (e.g., .jpeg), mime type (e.g., image/jpeg), JPEG Interchange Format (JFIF) version, orientation, resolution, software used in generating the file, date of modification, make, model, etc. As such, the transformer circuitry 325 can use any of the metadata information and/or the parameter extractor circuitry 320 to identify potential presence of malware and/or identify how the malware functions (e.g., via an infected domain, a function hidden in a header of the .jpg file, etc.).

In some examples, the process chain entity mapper circuitry 210 includes means for extracting metadata information. For example, the means for extracting metadata information may be implemented by metadata extractor circuitry 315. In some examples, the metadata extractor circuitry 315 may be implemented by machine executable instructions such as that implemented by at least block 530 of FIG. 5 executed by processor circuitry, which may be implemented by the example processor circuitry 612 of FIG. 6, the example processor circuitry 700 of FIG. 7, and/or the example Field Programmable Gate Array (FPGA) circuitry 800 of FIG. 8. In other examples, the metadata extractor circuitry 315 is implemented by other hardware logic circuitry, hardware implemented state machines, and/or any other combination of hardware, software, and/or firmware. For example, the metadata extractor circuitry 315 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

The parameter extractor circuitry 320 extracts command line parameter information (e.g., URL/Internet Protocol (IP), registry key path, etc.) from files received using the data receiver circuitry 305. In some examples, the parameter extractor circuitry 320 identifies web page content and/or domain names, given that this information can be used to identify phishing campaigns. In some examples, the parameter extractor circuitry 320 extracts commands used when launching a program to allow the program's functionality to change (e.g., specifying a file, specifying a default document, enabling specific features, etc.).

In some examples, the process chain entity mapper circuitry 210 includes means for extracting parameter information. For example, the means for extracting parameter information may be implemented by parameter extractor circuitry 320. In some examples, the parameter extractor circuitry 320 may be implemented by machine executable instructions such as that implemented by at least block 535 of FIG. 5 executed by processor circuitry, which may be implemented by the example processor circuitry 612 of FIG. 6, the example processor circuitry 700 of FIG. 7, and/or the example Field Programmable Gate Array (FPGA) circuitry 800 of FIG. 8. In other examples, the parameter extractor circuitry 320 is implemented by other hardware logic circuitry, hardware implemented state machines, and/or any other combination of hardware, software, and/or firmware. For example, the parameter extractor circuitry 320 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

The transformer circuitry 325 transforms the metadata and/or parameter-based information received from the metadata extractor circuitry 315 and/or the parameter extractor circuitry 320. For example, the transformer circuitry 325 transforms the process chain input 205 file(s) (e.g., files 220-245 of FIG. 2) into the process chain output 215 file(s) (e.g., files 250-275 of FIG. 2). For example, the transformer circuitry 325 evaluates the process chain input 205 file(s) against each potential pattern identified using the path alias identifier circuitry 310 until a match can be established. In some examples, the transformer circuitry 325 allows for the identification of commonly used paths for both trusted and/or untrusted process chain files. Likewise, the transformer circuitry 325 permits iterative mapping associated with discriminating future input files as clean or malicious.

In some examples, the process chain entity mapper circuitry 210 includes means for transforming data. For example, the means for transforming data may be implemented by transformer circuitry 325. In some examples, the transformer circuitry 325 may be implemented by machine executable instructions such as that implemented by at least block 420 of FIG. 4 executed by processor circuitry, which may be implemented by the example processor circuitry 612 of FIG. 6, the example processor circuitry 700 of FIG. 7, and/or the example Field Programmable Gate Array (FPGA) circuitry 800 of FIG. 8. In other examples, the transformer circuitry 325 is implemented by other hardware logic circuitry, hardware implemented state machines, and/or any other combination of hardware, software, and/or firmware. For example, the transformer circuitry 325 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

The data output circuitry 330 outputs the process chain output 215 file(s) (e.g., files 250-275 of FIG. 2) once the transformer circuitry 325 has completed the matching process and/or path identification based on the mapping rules/order criteria 280 of FIG. 2 (e.g., identified using the path alias identifier circuitry 310). The output file(s) output by the data output circuitry 330 retain key original entity characteristics in the transformed format, such that the original input signal can be retained.

In some examples, the process chain entity mapper circuitry 210 includes means for outputting transformed data. For example, the means for outputting transformed data may be implemented by data output circuitry 330. In some examples, the data output circuitry 330 may be implemented by machine executable instructions such as that implemented by at least block 540 of FIG. 5 executed by processor circuitry, which may be implemented by the example processor circuitry 612 of FIG. 6, the example processor circuitry 700 of FIG. 7, and/or the example Field Programmable Gate Array (FPGA) circuitry 800 of FIG. 8. In other examples, the data output circuitry 330 is implemented by other hardware logic circuitry, hardware implemented state machines, and/or any other combination of hardware, software, and/or firmware. For example, the data output circuitry 330 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

The data storage 335 stores information associated with the data receiver circuitry 305, the path alias identifier circuitry 310, the metadata extractor circuitry 315, the parameter extractor circuitry 320, the transformer circuitry 325, and/or the data output circuitry 330. The data storage 335 can be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The data storage 335 can additionally or alternatively be implemented by double data rate (DDR) memories, such as DDR, DDR2, DDR3, DDR4, mobile DDR (mDDR), etc. The data storage 335 can additionally or alternatively be implemented by one or more mass storage devices such as hard disk drive(s), compact disk drive(s), digital versatile disk drive(s), solid-state disk drive(s), etc. While in the illustrated example the data storage 335 is illustrated as a single database, the data storage 335 can be implemented by any number and/or type(s) of databases. Furthermore, the data stored in the data storage 335 can be in any data format such as, for example, binary data, comma delimited data, tab delimited data, structured query language (SQL) structures, etc.

While an example manner of implementing the process chain entity mapper circuitry 210 is illustrated in FIG. 3, one or more of the elements, processes, and/or devices illustrated in FIG. 3 may be combined, divided, re-arranged, omitted, eliminated, and/or implemented in any other way. Further, the example data receiver circuitry 305, the example path alias identifier circuitry 310, the example metadata extractor circuitry 315, the example parameter extractor circuitry 320, the example transformer circuitry 325, the example data output circuitry 330, and/or, more generally, the example process chain entity mapper circuitry 210 of FIG. 3, may be implemented by hardware, software, firmware, and/or any combination of hardware, software, and/or firmware. Thus, for example, any of the example data receiver circuitry 305, the example path alias identifier circuitry 310, the example metadata extractor circuitry 315, the example parameter extractor circuitry 320, the example transformer circuitry 325, the example data output circuitry 330, and/or, more generally, the example process chain entity mapper circuitry 210 of FIG. 3, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example data receiver circuitry 305, the example path alias identifier circuitry 310, the example metadata extractor circuitry 315, the example parameter extractor circuitry 320, the example transformer circuitry 325, the example data output circuitry 330, and/or, more generally, the example process chain entity mapper circuitry 210 of FIG. 3 is/are hereby expressly defined to include a non-transitory computer readable storage device or storage disk such as a memory, a digital versatile disk (DVD), a compact disk (CD), a Blu-ray disk, etc., including the software and/or firmware. Further still, the example process chain entity mapper circuitry 210 of FIG. 3 may include one or more elements, processes, and/or devices in addition to, or instead of, those illustrated in FIG. 3, and/or may include more than one of any or all of the illustrated elements, processes and devices.

Figure 4:
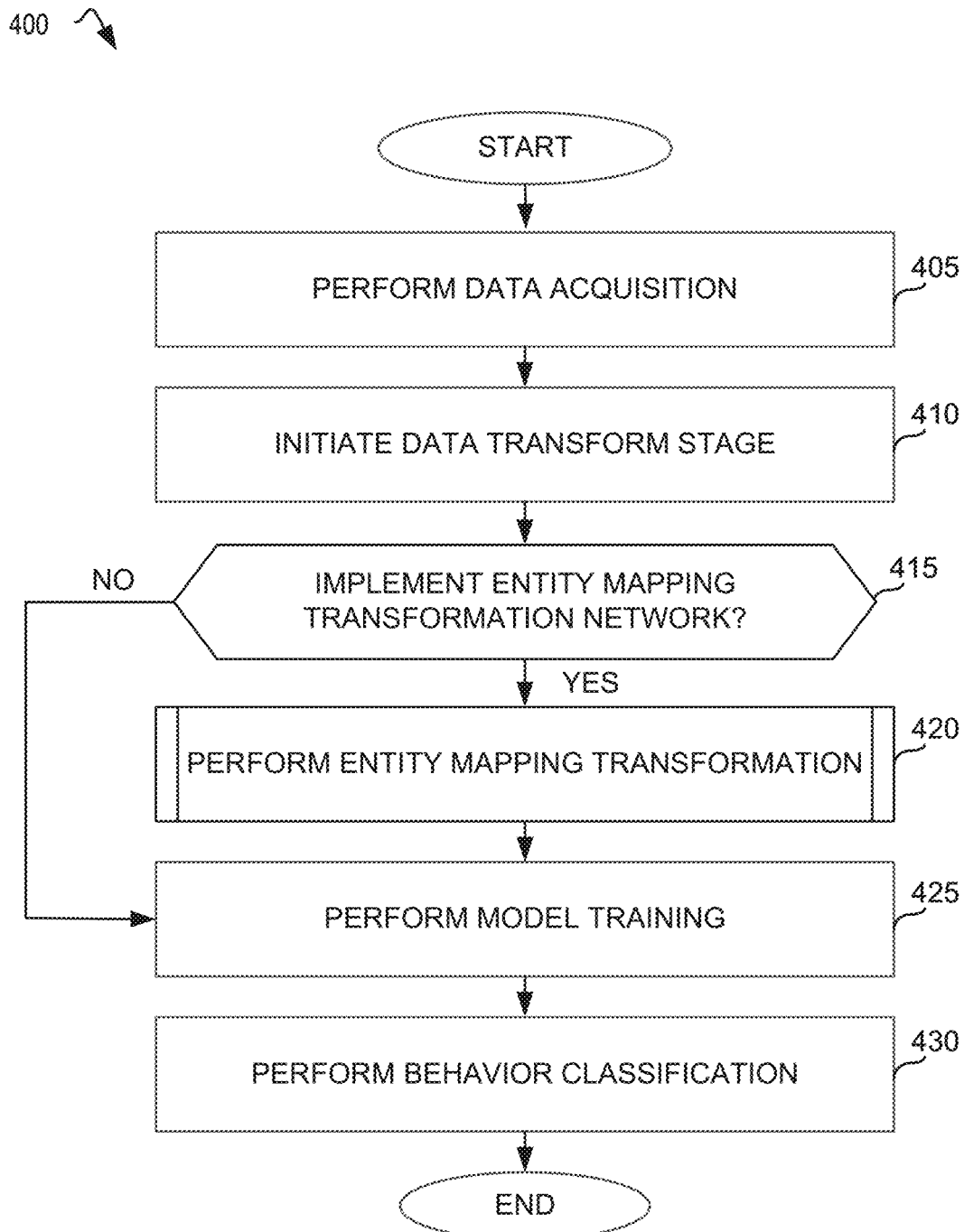
FIG. 4 is a flowchart representative of machine readable instructions which may be executed to implement the process chain entity mapper circuitry of FIGS. 2 and/or 3.

Flowcharts representative of example hardware logic circuitry, machine readable instructions, hardware implemented state machines, and/or any combination thereof for implementing the process chain entity mapper circuitry 210 of FIG. 3 are shown in FIGS. 4 and/or 5. The machine readable instructions may be one or more executable programs or portion(s) of an executable program for execution by processor circuitry, such as the processor circuitry 612 shown in the example processor platform 600 discussed below in connection with FIG. 6 and/or the example processor circuitry discussed below in connection with FIGS. 7 and/or 8. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowchart illustrated in FIGS. 4, 5, many other methods of implementing the example process chain entity mapper circuitry 210 of FIG. 3 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example operations of FIGS. 6-10 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 4 is a flowchart representative of machine readable instructions 400 which may be executed to implement the process chain entity mapper circuitry 210 of FIGS. 2 and/or 3. In the example of FIG. 4, the artificial intelligence-based model development for malware analysis 103 initiates data acquisition (e.g., the data acquisition stage 105 of FIG. 1) to collect data from various sources that can be used for model-based training (block 405). In some examples, the data acquisition can include data discovery, data augmentation, and/or data generation. Once the data acquisition is completed, the artificial intelligence-based model development for malware analysis 103 initiates the data transform stage 110 of FIG. 1 (block 410). In some examples, transforming the data includes processing the data prior to the training phase by changing the data type, accounting for missing data, converting data to specific formats, etc. In some examples, the artificial intelligence-based model development for malware analysis 103 identifies whether to implement an entity mapping transformation network (block 415). For example, given the availability of mapping rules and/or order criteria 280 of FIG. 2, the data transform stage 110 can include performing entity mapping transformation using the process chain entity mapper circuitry 210 of FIG. 2 (block 420).

In the absence of mapping rules and/or order criteria 280 and/or once the transformation process is complete using the process chain entity mapper circuitry 210, the artificial intelligence-based model development for malware analysis 103 proceeds model training (block 425). For example, the model training (e.g., based on the model training stage 115 of FIG. 1), can include training the model based on executable files used to extract a set of features that provide an abstract view of a given piece of software that can be used for the detection and/or classification of malware. Once the model training is complete, the artificial intelligence-based model development for malware analysis 103 initiates behavior classification based on the model training results. For example, the behavior classification can include identifying malware using a generalized format to determine whether a given process is malicious or benign. In some examples, a given file is identified as trusted and/or untrusted based on the evaluation performed against the mapping rules and/or order criteria 280, as described in connection with FIG. 1.

Figure 5:
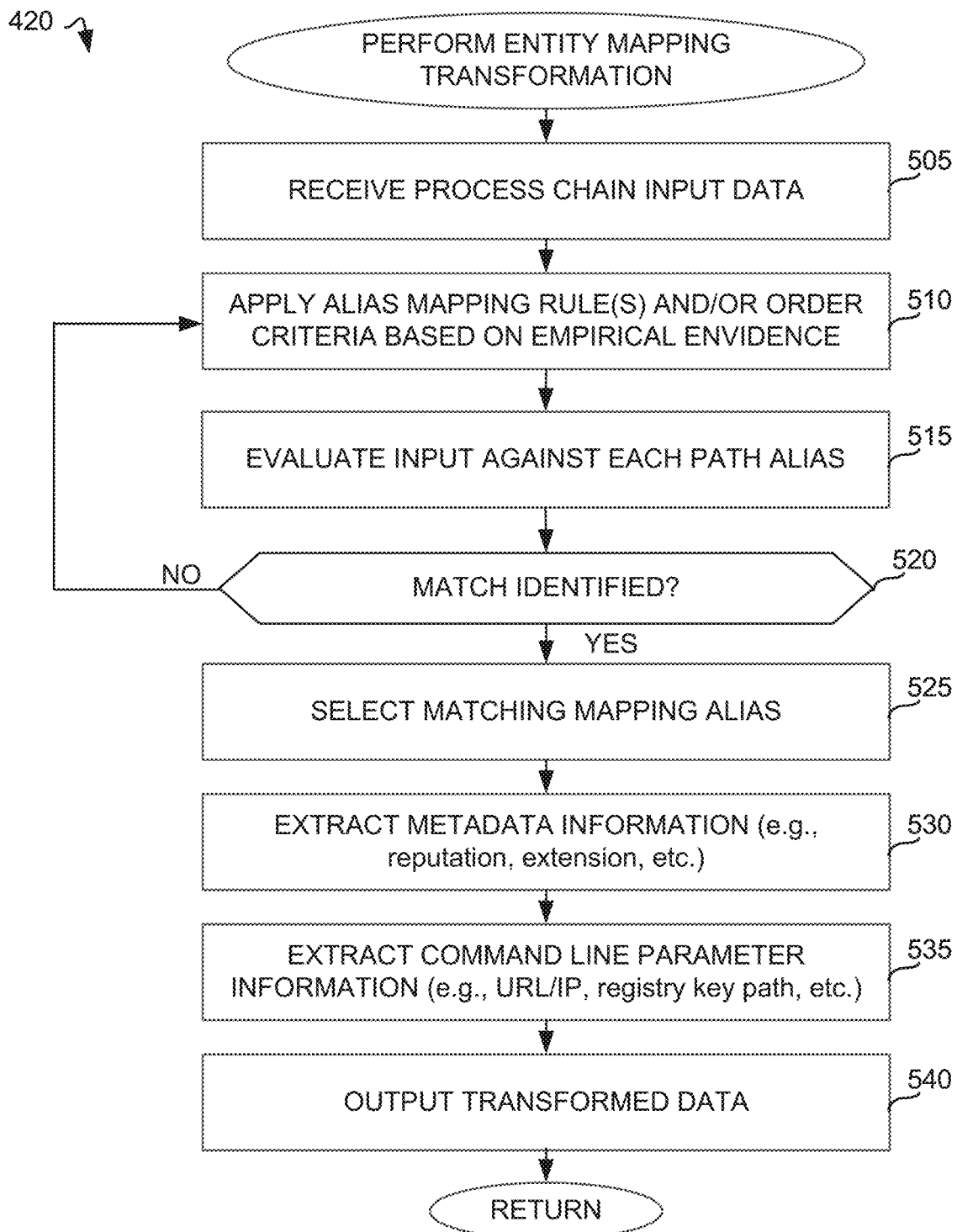
FIG. 5 is a flowchart representative of example machine readable instructions which may be executed to perform entity mapping transformation in accordance with FIG. 2.

FIG. 5 is a flowchart representative of example machine readable instructions 420 which may be executed to perform entity mapping transformation in accordance with FIG. 2. In the example of FIG. 5, the data receiver circuitry 305 receives process chain input data, such as the process chain input 205 of FIG. 2 (block 505). In some examples, the process chain input data includes input file(s) representing potential malware threats. For example, the process chain input data can originate from users submitting potential malware samples using computing device(s) 101 of FIG. 1. The input file(s) can include different file types (e.g., an executable file, a text file, etc.) and/or file origins. In some examples, the input file(s) can be selected to identify a specific type of malware attack, such as a fileless attack, which can be categorized as a low-observable characteristics (LOC) attack. In some examples, fileless malware can operate in memory. For example, fileless infections can directly invade the memory without being stored in a file and/or installed directly on a machine. In some examples, such LOC-based attacks can take advantage of legitimate tools used for task automation and/or configuration management (e.g., Microsoft Windows PowerShell, etc.). In some examples, social engineering is used to entice users to select a link or open an attachment in a phishing email, allowing access to valuable data. Given that security applications may not monitor whitelisted programs (e.g., PowerShell, Windows script host executable files, etc.) which can contact fileless malware, thereby allowing access to an enterprise network once an attack succeeds. Automated sensors used for detecting malware may not detect command line alterations present with fileless attacks. Therefore, the artificial intelligence-based model for malware analysis 103 of FIG. 1 can be used to detect and categorize potential threats based on entity mapping transformation performed using the process chain input 205.

Once the process chain input 205 is received, the path alias identifier circuitry 310 applies alias mapping rule(s) and/or order criteria (e.g., based on empirical evidence) to the process chain input 205 (block 510). For example, the path alias identifier circuitry 310 evaluates extendable dataframe(s) with information on potential system path format patterns and/or associated aliases for each of the potential system path format patterns. For example, the path alias identifier circuitry 310 identifies which patterns to prioritize when performing matching using the alias mapping rule(s) and/or order criteria. In some examples, the mapping rules and/or order criteria 280 can be based on empirical evidence derived from field telemetry (e.g., telemetry data received via a cloud server, including security-related information connected to file creations, timestamps, and/or any other data necessary for assessing targeted attacks via malware). For example, path alias identifier circuitry 310 evaluates the process chain input 205 file(s) against each potential pattern identified in the mapping rules and/or order criteria 280 (block 515). Once the path alias identifier circuitry 310 identifies a match (block 520), the path alias identifier circuitry 310 selects the matching mapping alias (block 525). If the path alias identifier circuitry 310 does not identify a mapping alias match, the path alias identifier circuitry 310 proceeds to continue identifying and/or applying alias mapping rule(s) and/or order criteria (block 510).

The metadata extractor circuitry 315 extracts metadata information (e.g., file reputation, process extension, etc.) for each file and/or entity processed once a mapping alias match has been identified using the path alias identifier circuitry 310 (block 530). For example, the metadata extractor circuitry 315 reviews files to extract information such as file type, file size, etc. For some files, the parameter extractor circuitry 320 extracts command line parameter information (e.g., URL/IP, registry key path, etc.) (block 535). For example, the parameter extractor circuitry 320 can use command line information to identify the presence of fileless malware. The transformer circuitry 325 transforms the metadata and/or parameter-based information received from the metadata extractor circuitry 315 and/or the parameter extractor circuitry 320. In some examples, the transformer circuitry 325 allows for the identification of commonly used paths for both trusted and/or untrusted process chain files. In some examples, the transformer circuitry 325 permits iterative mapping associated with discriminating future input files as clean or malicious. Once the transformer circuitry 325 transforms the matched files into transformed files (e.g., process chain output 215 output of FIG. 2), the data output circuitry 330 outputs the process chain output 215 file(s) (block 540). The resulting output files can be used in the model training stage 115 as part of the artificial intelligence-based model development for malware analysis 103 of FIG. 1.

Figure 6:
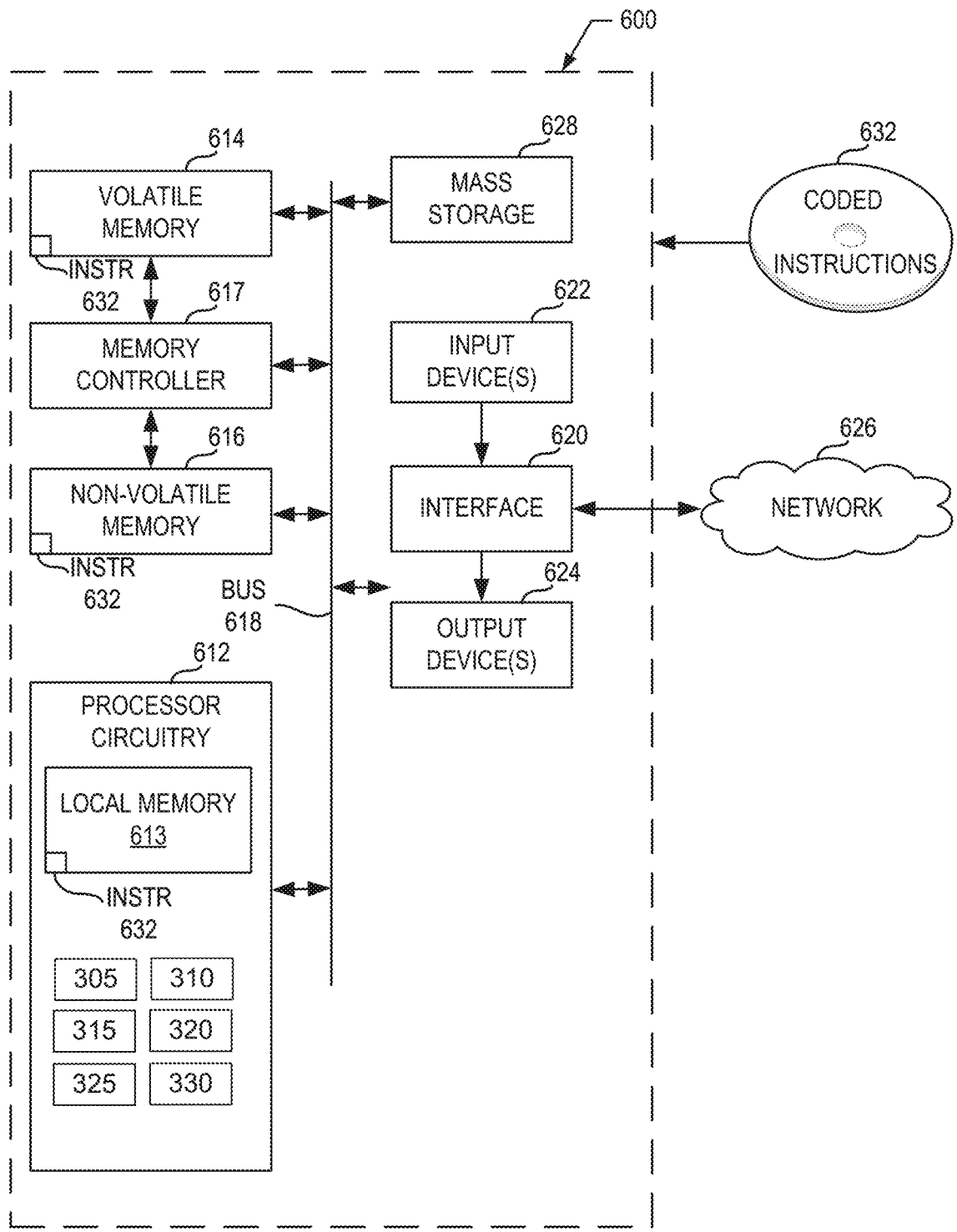
FIG. 6 is a block diagram of an example processing platform structured to execute the instructions of FIGS. 4 and/or 5 to implement the process chain entity mapper circuitry of FIGS. 2 and/or 3.

FIG. 6 is a block diagram of an example processing platform 600 structured to execute the instructions of FIGS. 4 and/or 5 to implement the process chain entity mapper circuitry 210 of FIGS. 2 and/or 3. The processor platform 600 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device. The processor platform 600 of the illustrated example includes processor circuitry 612. The processor circuitry 612 of the illustrated example is hardware. For example, the processor circuitry 612 can be implemented by one or more integrated circuits, logic circuits, FPGAs microprocessors, CPUs, GPUs, DSPs, and/or microcontrollers from any desired family or manufacturer. The processor circuitry 612 may be implemented by one or more semiconductor based (e.g., silicon based) devices. In this example, the processor circuitry 612 implements the data receiver circuitry 305, the path alias identifier circuitry 310, the metadata extractor circuitry 315, the parameter extractor circuitry 320, the transformer circuitry 325, and/or the data output circuitry 330.

The processor circuitry 612 of the illustrated example includes a local memory 613 (e.g., a cache, registers, etc.). The processor circuitry 612 of the illustrated example is in communication with a main memory including a volatile memory 614 and a non-volatile memory 616 by a bus 618. The volatile memory 614 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 616 may be implemented by flash memory and/or any other desired type of memory device. Access to the main memory 614, 616 of the illustrated example is controlled by a memory controller 617.

The processor platform 600 of the illustrated example also includes interface circuitry 620. The interface circuitry 620 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 622 are connected to the interface circuitry 620. The input device(s) 622 permit(s) a user to enter data and/or commands into the processor circuitry 612. The input device(s) 602 can be implemented by, for example, an audio sensor, a microphone, a camera (still or video), a keyboard, a button, a mouse, a touchscreen, a track-pad, a trackball, an isopoint device, and/or a voice recognition system.

One or more output devices 624 are also connected to the interface circuitry 620 of the illustrated example. The output devices 624 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 620 of the illustrated example, thus, typically includes a graphics driver card, a graphics driver chip, and/or graphics processor circuitry such as a GPU.

The interface circuitry 620 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 626. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 600 of the illustrated example also includes one or more mass storage devices 628 to store software and/or data. Examples of such mass storage devices 628 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 632, which may be implemented by the machine readable instructions of FIGS. 4-5, may be stored in the mass storage device 628, in the volatile memory 614, in the non-volatile memory 616, and/or on a removable non-transitory computer readable storage medium such as a CD or DVD.

Figure 7:
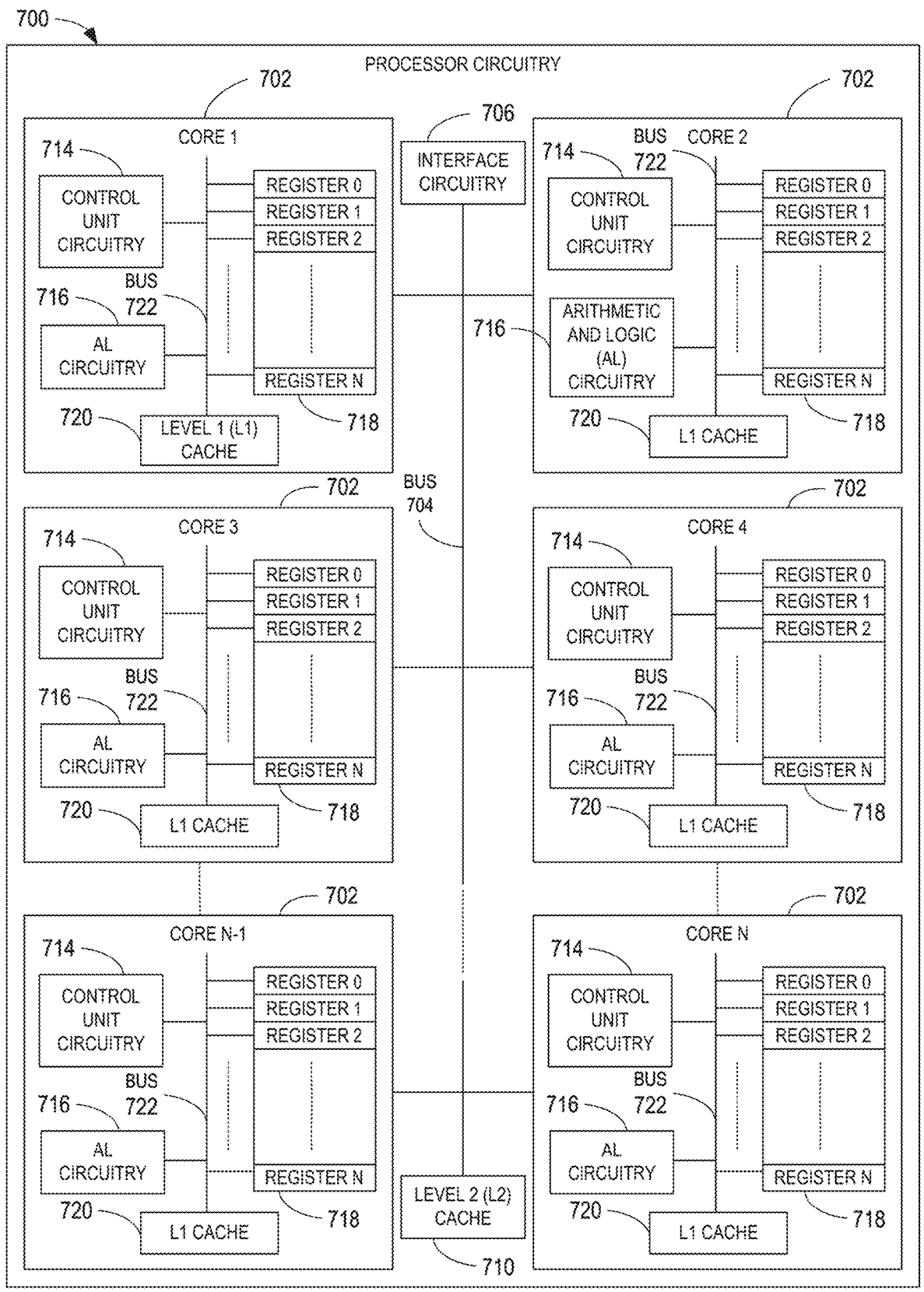
FIG. 7 is a block diagram of an example implementation of the processor circuitry of FIG. 6.

FIG. 7 is a block diagram of an example implementation of the processor circuitry 700 of FIG. 6. In this example, the processor circuitry 612 of FIG. 6 is implemented by a microprocessor 700. For example, the microprocessor 700 may implement multi-core hardware circuitry such as a CPU, a DSP, a GPU, an XPU, etc. Although it may include any number of example cores 702 (e.g., 1 core), the microprocessor 700 of this example is a multi-core semiconductor device including N cores. The cores 702 of the microprocessor 700 may operate independently or may cooperate to execute machine readable instructions. For example, machine code corresponding to a firmware program, an embedded software program, or a software program may be executed by one of the cores 702 or may be executed by multiple ones of the cores 702 at the same or different times. In some examples, the machine code corresponding to the firmware program, the embedded software program, or the software program is split into threads and executed in parallel by two or more of the cores 702. The software program may correspond to a portion or all of the machine readable instructions and/or operations represented by the flowcharts of FIGS. 4-5.

The cores 702 may communicate by an example bus 704. In some examples, the bus 704 may implement a communication bus to effectuate communication associated with one(s) of the cores 702. For example, the bus 704 may implement at least one of an Inter-Integrated Circuit (I2C) bus, a Serial Peripheral Interface (SPI) bus, a PCI bus, or a PCIe bus. Additionally or alternatively, the bus 704 may implement any other type of computing or electrical bus. The cores 702 may obtain data, instructions, and/or signals from one or more external devices by example interface circuitry 706. The cores 702 may output data, instructions, and/or signals to the one or more external devices by the interface circuitry 706. Although the cores 702 of this example include example local memory 720 (e.g., Level 1 (L1) cache that may be split into an L1 data cache and an L1 instruction cache), the microprocessor 700 also includes example shared memory 710 that may be shared by the cores (e.g., Level 2 (L2_ cache)) for high-speed access to data and/or instructions. Data and/or instructions may be transferred (e.g., shared) by writing to and/or reading from the shared memory 710. The local memory 720 of each of the cores 702 and the shared memory 710 may be part of a hierarchy of storage devices including multiple levels of cache memory and the main memory (e.g., the main memory 614, 616 of FIG. 6). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 702 may be referred to as a CPU, DSP, GPU, etc., or any other type of hardware circuitry. Each core 702 includes control unit circuitry 714, arithmetic and logic (AL) circuitry (sometimes referred to as an ALU) 716, a plurality of registers 718, the L1 cache 720, and an example bus 722. Other structures may be present. For example, each core 702 may include vector unit circuitry, single instruction multiple data (SIMD) unit circuitry, load/store unit (LSU) circuitry, branch/jump unit circuitry, floating-point unit (FPU) circuitry, etc. The control unit circuitry 714 includes semiconductor-based circuits structured to control (e.g., coordinate) data movement within the corresponding core 702. The AL circuitry 716 includes semiconductor-based circuits structured to perform one or more mathematic and/or logic operations on the data within the corresponding core 702. The AL circuitry 716 of some examples performs integer based operations. In other examples, the AL circuitry 716 also performs floating point operations. In yet other examples, the AL circuitry 716 may include first AL circuitry that performs integer based operations and second AL circuitry that performs floating point operations. In some examples, the AL circuitry 716 may be referred to as an Arithmetic Logic Unit (ALU). The registers 718 are semiconductor-based structures to store data and/or instructions such as results of one or more of the operations performed by the AL circuitry 716 of the corresponding core 702. For example, the registers 718 may include vector register(s), SIMD register(s), general purpose register(s), flag register(s), segment register(s), machine specific register(s), instruction pointer register(s), control register(s), debug register(s), memory management register(s), machine check register(s), etc. The registers 718 may be arranged in a bank as shown in FIG. 7. Alternatively, the registers 718 may be organized in any other arrangement, format, or structure including distributed throughout the core 702 to shorten access time. The bus 722 may implement at least one of an I2C bus, a SPI bus, a PCI bus, or a PCIe bus.

Each core 702 and/or, more generally, the microprocessor 700 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 700 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 8:
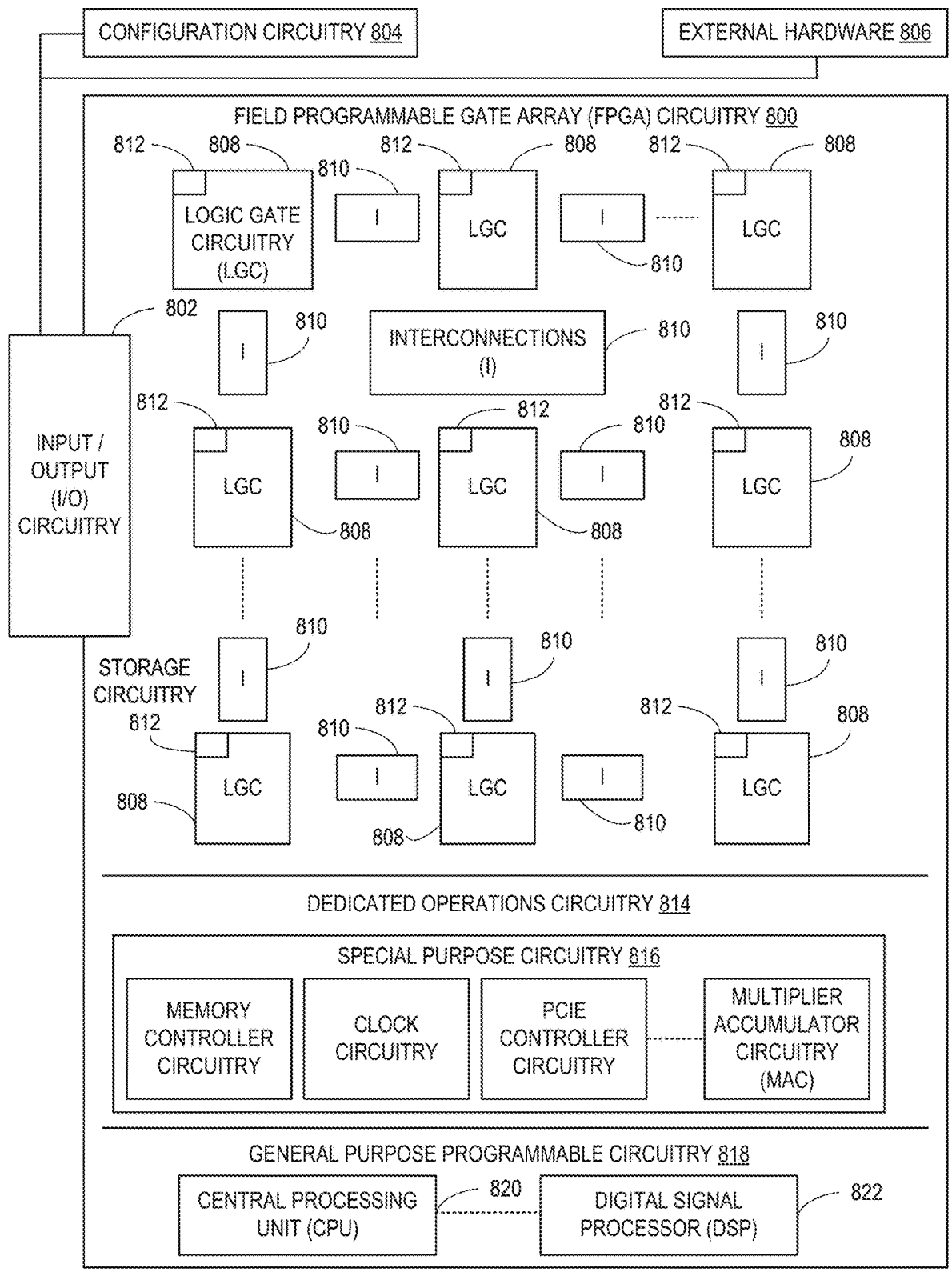
FIG. 8 is a block diagram of another example implementation of the processor circuitry of FIG. 6.

FIG. 8 is a block diagram of another example implementation of the processor circuitry 600 of FIG. 6. In this example, the processor circuitry 612 is implemented by FPGA circuitry 800. The FPGA circuitry 800 can be used, for example, to perform operations that could otherwise be performed by the example microprocessor 700 of FIG. 7 executing corresponding machine readable instructions. However, once configured, the FPGA circuitry 800 instantiates the machine readable instructions in hardware and, thus, can often execute the operations faster than they could be performed by a general purpose microprocessor executing the corresponding software.

More specifically, in contrast to the microprocessor 700 of FIG. 7 described above (which is a general purpose device that may be programmed to execute some or all of the machine readable instructions represented by the flowcharts of FIGS. 4-5 but whose interconnections and logic circuitry are fixed once fabricated), the FPGA circuitry 800 of the example of FIG. 8 includes interconnections and logic circuitry that may be configured and/or interconnected in different ways after fabrication to instantiate, for example, some or all of the machine readable instructions represented by the flowcharts of FIGS. 4-5. In particular, the FPGA 800 may be thought of as an array of logic gates, interconnections, and switches. The switches can be programmed to change how the logic gates are interconnected by the interconnections, effectively forming one or more dedicated logic circuits (unless and until the FPGA circuitry 800 is reprogrammed). The configured logic circuits enable the logic gates to cooperate in different ways to perform different operations on data received by input circuitry. Those operations may correspond to some or all of the software represented by the flowcharts of FIGS. 4-5. As such, the FPGA circuitry 800 may be structured to effectively instantiate some or all of the machine readable instructions of the flowcharts of FIGS. 4-5 as dedicated logic circuits to perform the operations corresponding to those software instructions in a dedicated manner analogous to an ASIC. Therefore, the FPGA circuitry 800 may perform the operations corresponding to the some or all of the machine readable instructions of FIGS. 4-5 faster than the general purpose microprocessor can execute the same.

In the example of FIG. 8, the FPGA circuitry 800 is structured to be programmed (and/or reprogrammed one or more times) by an end user by a hardware description language (HDL) such as Verilog. The FPGA circuitry 800 of FIG. 8, includes example input/output (I/O) circuitry 802 to obtain and/or output data to/from example configuration circuitry 804 and/or external hardware (e.g., external hardware circuitry) 806. For example, the configuration circuitry 804 may implement interface circuitry that may obtain machine readable instructions to configure the FPGA circuitry 800, or portion(s) thereof. In some such examples, the configuration circuitry 804 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 706 may implement the microprocessor 700 of FIG. 7. The FPGA circuitry 800 also includes an array of example logic gate circuitry 808, a plurality of example configurable interconnections 810, and example storage circuitry 812. The logic gate circuitry 808 and interconnections 810 are configurable to instantiate one or more operations that may correspond to at least some of the machine readable instructions of FIGS. 4-5 and/or other desired operations. The logic gate circuitry 808 shown in FIG. 8 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 808 to enable configuration of the electrical structures and/or the logic gates to form circuits to perform desired operations. The logic gate circuitry 808 may include other electrical structures such as look-up tables (LUTs), registers (e.g., flip-flops or latches), multiplexers, etc.

The interconnections 810 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 808 to program desired logic circuits.

The storage circuitry 812 of the illustrated example is structured to store result(s) of the one or more of the operations performed by corresponding logic gates. The storage circuitry 812 may be implemented by registers or the like. In the illustrated example, the storage circuitry 812 is distributed amongst the logic gate circuitry 808 to facilitate access and increase execution speed.

The example FPGA circuitry 800 of FIG. 8 also includes example Dedicated Operations Circuitry 814. In this example, the Dedicated Operations Circuitry 814 includes special purpose circuitry 816 that may be invoked to implement commonly used functions to avoid the need to program those functions in the field. Examples of such special purpose circuitry 816 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 800 may also include example general purpose programmable circuitry 818 such as an example CPU 820 and/or an example DSP 822. Other general purpose programmable circuitry 818 may additionally or alternatively be present such as a GPU, an XPU, etc., that can be programmed to perform other operations.

Although FIGS. 7 and 8 illustrate two example implementations of the processor circuitry 612 of FIG. 6 many other approaches are contemplated. For example, as mentioned above, modern FPGA circuitry may include an onboard CPU, such as one or more of the example CPU 820 of FIG. 8. Therefore, the processor circuitry 712 of FIG. 7 may additionally be implemented by combining the example microprocessor 700 of FIG. 7 and the example FPGA circuitry 800 of FIG. 8. In some such hybrid examples, a first portion of the machine readable instructions represented by the flowcharts of FIGS. 4-5 may be executed by one or more of the cores 802 of FIG. 8 and a second portion of the machine readable instructions represented by the flowchart of FIGS. 4-5 may be executed by the FPGA circuitry 800 of FIG. 8.

In some examples, the processor circuitry 612 of FIG. 6 may be in one or more packages. For example, the processor circuitry 700 of FIG. 7 and/or the FPGA circuitry 800 of FIG. 8 may be in one or more packages. In some examples, an XPU may be implemented by the processor circuitry 612 of FIG. 6 which may be in one or more packages. For example, the XPU may include a CPU in one package, a DSP in another package, a GPU in yet another package, and an FPGA in still yet another package.

Figure 9:
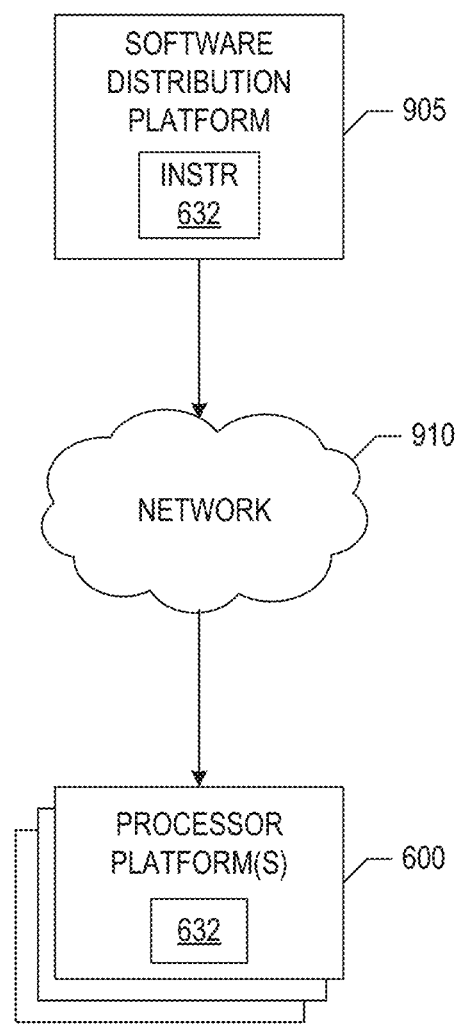
FIG. 9 is a block diagram of an example software distribution platform (e.g., one or more servers) to distribute software (e.g., software corresponding to the example machine readable instructions of FIGS. 4 and/or 5) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 905 to distribute software such as the example machine readable instructions 632 of FIG. 6 to hardware devices owned and/or operated by third parties is illustrated in FIG. 9. The example software distribution platform 905 may be implemented by any computer server, data facility, cloud service, etc., capable of storing and transmitting software to other computing devices. The third parties may be customers of the entity owning and/or operating the software distribution platform 905. For example, the entity that owns and/or operates the software distribution platform 905 may be a developer, a seller, and/or a licensor of software such as the example machine readable instructions 632 of FIG. 6. The third parties may be consumers, users, retailers, OEMs, etc., who purchase and/or license the software for use and/or re-sale and/or sub-licensing. In the illustrated example, the software distribution platform 905 includes one or more servers and one or more storage devices. The storage devices store the machine readable instructions 632 which may correspond to the example machine readable instructions of FIGS. 4-5, as described above. The one or more servers of the example software distribution platform 905 are in communication with a network 910, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 632 from the software distribution platform 905. For example, the software, which may correspond to the example machine readable instructions of FIGS. 4-6, may be downloaded to the example processor platform 600 which is to execute the machine readable instructions 632 to implement the process chain entity mapper circuitry 210. In some example, one or more servers of the software distribution platform 905 periodically offer, transmit, and/or force updates to the software (e.g., the example machine readable instructions 632 of FIG. 6) to ensure improvements, patches, updates, etc., are distributed and applied to the software at the end user devices.

From the foregoing, it will be appreciated that methods and apparatus disclosed herein introduce an entity mapping transformation framework within the data transform stage of an artificial intelligence model to improve the detection of malware. Methods and apparatus disclosed herein permit the reduction of the number of parameters required to represent the same data without loss of information. Furthermore, methods and apparatus disclosed herein introduce artificial intelligence-based model training time and/or cost reduction and the potential for better tuned models and out-of-sample classification metrics. The transformed entities also guard against overfitting and can make available generalizable building blocks amenable to both model and rules-based approaches. Furthermore, methods and apparatus disclosed herein permit the inclusion of mappings allowing discrimination of clean and/or malicious process chain actors in traces.

Example methods, apparatus, systems, and articles of manufacture for generic process chain entity mapping are disclosed herein. Further examples and combinations thereof include the following:

Example 1 includes an apparatus to perform process chain entity mapping, the apparatus comprising at least one memory, instructions in the apparatus, and processor circuitry to execute the instructions to receive process chain input data, the input data including a system path, identify a match between a path alias and the input data, wherein the path alias includes an alias for one or more system path format patterns, extract at least one of (1) metadata information or (2) command line parameter information from the match, and output transformed data based on the at least one of the extracted metadata information or command line parameter information.

Example 2 includes the apparatus of example 1, wherein the process chain input data includes at least one of an executable file, a text file, or a Uniform Resource Locator (URL) file.

Example 3 includes the apparatus of example 1, wherein the processor circuitry is to identify the path alias using path alias mapping rules, the mapping rules based on empirical evidence obtained using field telemetry data.

Example 4 includes the apparatus of example 1, wherein the process circuitry is to prioritize select system path format patterns when identifying the match.

Example 5 includes the apparatus of example 1, wherein the metadata information includes at least one of a file reputation or a process extension.

Example 6 includes the apparatus of example 1, wherein the command line parameter information includes at least one of a registry key path or an internet protocol address.

Example 7 includes the apparatus of example 1, wherein the processor circuitry is to identify the process chain input data as clean or malicious based on the transformed data output.

Example 8 includes the apparatus of example 1, wherein the processor circuitry is to perform iterative mapping to discriminate future input data as clean or malicious.

Example 9 includes the apparatus of example 1, wherein the transformed data retains original entity characteristics to retain an original input signal associated with the input data.

Example 10 includes a non-transitory computer readable storage medium comprising instructions which, when executed, cause at least one processor to at least receive process chain input data, the input data including a system path, identify a match between a path alias and the input data, wherein the path alias includes an alias for one or more system path format patterns, extract at least one of (1) metadata information or (2) command line parameter information from the match, and output transformed data based on the at least one of extracted metadata information or command line parameter information.

Example 11 includes the non-transitory computer readable storage medium of example 10, wherein the instructions, when executed, cause the at least one processor to identify the path alias using path alias mapping rules, the mapping rules based on empirical evidence obtained using field telemetry data.

Example 12 includes the non-transitory computer readable storage medium of example 10, wherein the instructions, when executed, cause the at least one processor to prioritize select system path format patterns when identifying the match.

Example 13 includes the non-transitory computer readable storage medium of example 10, wherein the instructions, when executed, cause the at least one processor to identify the process chain input data as clean or malicious based on the transformed data output.

Example 14 includes a method to perform process chain entity mapping, the method comprising receiving, by executing an instruction with a processor, process chain input data, the input data including a system path, identifying, by executing an instruction with a processor, a match between a path alias and the input data, wherein the path alias includes an alias for one or more system path format patterns, extracting, by executing an instruction with a processor, at least one of (1) metadata information or (2) command line parameter information from the match, and outputting, by executing an instruction with a processor, transformed data based on the at least one of extracted metadata information or command line parameter information.

Example 15 includes the method of example 14, further including identifying, by executing an instruction with a processor, the path alias using path alias mapping rules, the mapping rules based on empirical evidence obtained using field telemetry data.

Example 16 includes the method of example 14, further including identifying, by executing an instruction with a processor, the process chain input data as clean or malicious based on the transformed data output.

Example 17 includes the method of example 14, further including performing, by executing an instruction with a processor, iterative mapping to discriminate future input data as clean or malicious.

Example 18 includes an apparatus comprising means for receiving process chain input data, the input data including a system path, means for identifying a match between a path alias and the input data, wherein the path alias includes an alias for one or more system path format patterns, means for extracting at least one of (1) metadata information or (2) command line parameter information from the match, and means for outputting transformed data based on extracted metadata information or command line parameter information.

Example 19 includes the apparatus of example 18, wherein the means for identifying includes identifying the path alias using path alias mapping rules, the mapping rules based on empirical evidence obtained using field telemetry data.

Example 20 includes the apparatus of example 18, wherein the means for extracting includes extracting at least one of a file reputation or a process extension.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus to perform process chain entity mapping, the apparatus comprising:
   at least one memory;
   instructions in the apparatus; and
   processor circuitry to execute the instructions to:
   receive process chain input data, the input data including a system path;
   identify a match between a path alias and the input data, wherein the path alias includes an alias for one or more system path format patterns;
   extract at least one of (1) metadata information or (2) command line parameter information from the match; and
   output transformed data based on the at least one of the metadata information or command line parameter information.

2. The apparatus of claim 1, wherein the process chain input data includes at least one of an executable file, a text file, or a Uniform Resource Locator (URL) file.

3. The apparatus of claim 1, wherein the processor circuitry is to identify the path alias using path alias mapping rules, the mapping rules based on empirical evidence obtained using field telemetry data.

4. The apparatus of claim 1, wherein the process circuitry is to prioritize select system path format patterns when identifying the match.

5. The apparatus of claim 1, wherein the metadata information includes at least one of a file reputation or a process extension.

6. The apparatus of claim 1, wherein the command line parameter information includes at least one of a registry key path or an internet protocol address.

7. The apparatus of claim 1, wherein the processor circuitry is to identify the process chain input data as clean or malicious based on the transformed data output.

8. The apparatus of claim 1, wherein the processor circuitry is to perform iterative mapping to discriminate future input data as clean or malicious.

9. The apparatus of claim 1, wherein the transformed data retains original entity characteristics to retain an original input signal associated with the input data.

10. A non-transitory computer readable storage medium comprising instructions which, when executed, cause at least one processor to at least:
    receive process chain input data, the input data including a system path;
    identify a match between a path alias and the input data, wherein the path alias includes an alias for one or more system path format patterns;
    extract at least one of (1) metadata information or (2) command line parameter information from the match; and output transformed data based on the at least one of the metadata information or the command line parameter information.

11. The non-transitory computer readable storage medium of claim 10, wherein the instructions, when executed, cause the at least one processor to identify the path alias using path alias mapping rules, the mapping rules based on empirical evidence obtained using field telemetry data.

12. The non-transitory computer readable storage medium of claim 10, wherein the instructions, when executed, cause the at least one processor to prioritize select system path format patterns when identifying the match.

13. The non-transitory computer readable storage medium of claim 10, wherein the instructions, when executed, cause the at least one processor to identify the process chain input data as clean or malicious based on the transformed data output.

14. A method to perform process chain entity mapping, the method comprising:
  receiving, by executing an instruction with a processor, process chain input data, the input data including a system path;
  identifying, by executing an instruction with a processor, a match between a path alias and the input data, wherein the path alias includes an alias for one or more system path format patterns;
  extracting, by executing an instruction with a processor, at least one of (1) metadata information or (2) command line parameter information from the match; and
  outputting, by executing an instruction with a processor, transformed data based on the at least one of the metadata information or the command line parameter information.

15. The method of claim 14, further including identifying, by executing an instruction with a processor, the path alias using path alias mapping rules, the mapping rules based on empirical evidence obtained using field telemetry data.

16. The method of claim 14, further including identifying, by executing an instruction with a processor, the process chain input data as clean or malicious based on the transformed data output.

17. The method of claim 14, further including performing, by executing an instruction with a processor, iterative mapping to discriminate future input data as clean or malicious.

18. An apparatus comprising:
  means for receiving process chain input data, the input data including a system path;
  means for identifying a match between a path alias and the input data, wherein the path alias includes an alias for one or more system path format patterns;
  means for extracting at least one of (1) metadata information or (2) command line parameter information from the match; and
  means for outputting transformed data based on the metadata information or the command line parameter information.

19. The apparatus of claim 18, wherein the means for identifying includes identifying the path alias using path alias mapping rules, the mapping rules based on empirical evidence obtained using field telemetry data.

20. The apparatus of claim 18, wherein the means for extracting includes extracting at least one of a file reputation or a process extension.

* * * * *